(12) United States Patent
Adachi (10) Patent No.: US 11,244,000 B2
(45) Date of Patent: Feb. 8, 2022

(54) INFORMATION PROCESSING APPARATUS AND NON-TRANSITORY COMPUTER READABLE MEDIUM STORING PROGRAM FOR CREATING INDEX FOR DOCUMENT RETRIEVAL

(71) Applicant: FUJIFILM Business Innovation Corp., Tokyo (JP)

(72) Inventor: Naoki Adachi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/509,479

(22) Filed: Jul. 11, 2019

(65) Prior Publication Data

US 2020/0311125 A1 Oct. 1, 2020

(30) Foreign Application Priority Data

Mar. 25, 2019 (JP) .............................. JP2019-055950

(51) Int. Cl.
| | |
|---|---|
| *G06F 17/00* | (2019.01) |
| *G06F 16/51* | (2019.01) |
| *G06F 16/332* | (2019.01) |
| *H04N 1/21* | (2006.01) |

(52) U.S. Cl.
CPC .......... *G06F 16/51* (2019.01); *G06F 16/3323* (2019.01); *H04N 1/2166* (2013.01)

(58) Field of Classification Search
CPC ................. G06F 16/51; G06F 16/3323; G06F 17/30707; G06F 17/2705; G06F 17/2785; G06F 3/04886; G06F 40/30; G06F 16/353; G06F 40/242; G06F 40/247; G06F 16/93; G06F 16/2228; H04N 1/2166; G06Q 10/107
USPC .......................................................... 715/241
See application file for complete search history.

(56) References Cited

U.S. PATENT DOCUMENTS

| | | | | | |
|---|---|---|---|---|---|
| 5,983,246 | A | * | 11/1999 | Takano ................... | G06F 40/20 |
| | | | | | 715/223 |
| 8,255,408 | B1 | * | 8/2012 | Begeja ................ | G06F 16/7867 |
| | | | | | 707/758 |
| 2007/0203885 | A1 | * | 8/2007 | Kim ........................ | G06F 40/30 |
| 2007/0208761 | A1 | * | 9/2007 | Lunt ..................... | G06Q 10/107 |
| 2016/0029055 | A1 | * | 1/2016 | Nunez ................. | H04N 21/4667 |
| | | | | | 725/14 |

(Continued)

FOREIGN PATENT DOCUMENTS

| | | |
|---|---|---|
| JP | H10214268 | 8/1998 |
| JP | 2000235579 | 8/2000 |
| JP | 2015032281 | 2/2015 |

*Primary Examiner* — Jason T Edwards
(74) *Attorney, Agent, or Firm* — JCIPRNET (57) ABSTRACT

An information processing apparatus includes a document information acquisition section that acquires document information with which a document type of a document is associated, a document type information acquisition section that acquires document type information, in which a reference range of a document referenced in a case of creating index data is set, for each document type of a document, and a creation section that creates the index data of the document with reference to a range of the document corresponding to the reference range set in the document type information associated with the document type of the document.

11 Claims, 8 Drawing Sheets

(56) References Cited

U.S. PATENT DOCUMENTS

2016/0055413 A1\* 2/2016 Popov ................ G06K 9/00469
706/55
2018/0075254 A1\* 3/2018 Reid ..................... G06F 40/205
2018/0189277 A1\* 7/2018 Mullins .................. G06F 16/93

\* cited by examiner

```
DOCUMENT TYPE SELECTION SCREEN

No.    DOCUMENT TYPE
 1     WRITTEN CONTRACT   [SETTING]
 2     PUBLICATION        [SETTING]
 3     THESIS             [SETTING]
 4     PURCHASE ORDER     [SETTING]
              ⋮
```

FIG. 4

DOCUMENT TYPE INFORMATION SETTING SCREEN

DOCUMENT TYPE: WRITTEN CONTRACT
LIFE CYCLE: IN-BUSINESS-NEGOTIATION ⇒ CONTRACT PERIOD ⇒ ARCHIVED ⇒ DISCARDED

| No. | DOCUMENT STRUCTURE | | INDEXING TARGET |
|---|---|---|---|
| 1 | PREAMBLE | | ☑ |
| 2 | ISSUE | | ☑ |
| 3 | PURPOSE | | ☑ |
| 4 | CONTRACT CONTENT (MAIN PART) | PAYMENT CONDITION | ☑ |
| 5 | | FORFEITURE OF BENEFIT OF TIME CLAUSE | ☑ |
| 6 | | CONTRACT PERIOD | |
| 7 | | PRICE | |
| 8 | | NOTIFICATION METHOD | ☑ |
| 9 | | PAYMENT METHOD | |
| 10 | | PROVISIONS RELATING TO RIGHTS AND DUTIES | ☑ |
| 11 | | IN CASE OF DEFAULT | |
| 12 | | COMPENSATION FOR DAMAGE | |
| 13 | | ITEM RELATING TO CANCELLATION OF CONTRACT | |
| 14 | | IN CASE CAUSED BY FORCE MAJEURE | |
| 15 | | JURISDICTION | |
| 16 | SIGNATURE | | |
| 17 | LIST | | ☑ |
| 18 | DATE OF CREATION | | ☑ |
| 19 | REVENUE STAMP | | |
| 20 | CLOSING PART | | |

CLOSE

FIG. 5

STATE-BASED DOCUMENT TYPE INFORMATION SETTING SCREEN

DOCUMENT TYPE: WRITTEN CONTRACT
LIFE CYCLE: CONTRACT PERIOD
INDEX CAPACITY WEIGHTING COEFFICIENT: [1.5] ~27

| No. | DOCUMENT STRUCTURE | | INDEXING TARGET | INDEXING PRIORITY |
|---|---|---|---|---|
| 1 | PREAMBLE | | ✓ | 1 |
| 2 | ISSUE | | ✓ | 2 |
| 3 | PURPOSE | | | |
| 4 | CONTRACT CONTENT (MAIN PART) | PAYMENT CONDITION | ✓ | 5 |
| 5 | | FORFEITURE OF BENEFIT OF TIME CLAUSE | ✓ | 6 |
| 6 | | CONTRACT PERIOD | | |
| 7 | | PRICE | | |
| 8 | | NOTIFICATION METHOD | | |
| 9 | | PAYMENT METHOD | ✓ | 7 |
| 10 | | PROVISIONS RELATING TO RIGHTS AND DUTIES | | |
| 11 | | IN CASE OF DEFAULT | ✓ | 8 |
| 12 | | COMPENSATION FOR DAMAGE | | |
| 13 | | ITEM RELATING TO CANCELLATION OF CONTRACT | | |
| 14 | | IN CASE CAUSED BY FORCE MAJEURE | | |
| 15 | | JURISDICTION | | |
| 16 | SIGNATURE | | | |
| 17 | LIST | | ✓ | 3 |
| 18 | DATE OF CREATION | | ✓ | 4 |
| 19 | REVENUE STAMP | | | |
| 20 | CLOSING PART | | | |

~26

[CLOSE]

DOCUMENT INFORMATION

| FILE NAME | DOCUMENT DATA | ATTRIBUTE INFORMATION | | | |
|---|---|---|---|---|---|
| | | DOCUMENT TYPE | WRITTEN CONTRACT | | ... |
| ABC COMPANY WRITTEN CONTRACT.xxx | BINARY DATA | THESIS | CONTRACT PERIOD | | |
| RESEARCH THESIS.yyy | BINARY DATA | PUBLICATION | APPROVED | | |
| ECONOMICS A.zzz | BINARY DATA | DOCUMENT STATE | UNDER CIRCULATION | | |

_US 11,244,000 B2_

INFORMATION PROCESSING APPARATUS AND NON-TRANSITORY COMPUTER READABLE MEDIUM STORING PROGRAM FOR CREATING INDEX FOR DOCUMENT RETRIEVAL

CROSS-REFERENCE TO RELATED APPLICATIONS

This application is based on and claims priority under 35 USC 119 from Japanese Patent Application No. 2019-055950 filed Mar. 25, 2019.

BACKGROUND

(i) Technical Field

The present invention relates to an information processing apparatus, and a non-transitory computer readable medium storing a program.

(ii) Related Art

In order to retrieve a database, an index may be created in advance by extracting a keyword representing a feature of a document from the document by indexing.
A crawler can shorten a retrieval time by retrieving the index in a case of crawling the document.
Since creating an index with an entire document as a reference range may require a large amount of time, the index may be created with a predetermined part as a reference range instead of the entire document. JP1998-214268A, JP2000-235579A, and JP2015-032281A are examples of the related art.

SUMMARY

Aspects of non-limiting embodiments of the present disclosure relate to an information processing apparatus, and a non-transitory computer readable medium storing a program for improving a retrieval accuracy as compared to a case of creating index data with reference to a predetermined part of a document and without considering a document type.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a document information acquisition section that acquires document information with which a document type of a document is associated, a document type information acquisition section that acquires document type information, in which a reference range of a document referenced in a case of creating index data is set, for each document type of a document, and a creation section that creates the index data of the document with reference to a range of the document corresponding to the reference range set in the document type information associated with the document type of the document.

BRIEF DESCRIPTION OF THE DRAWINGS

Exemplary embodiment(s) of the present invention will be described in detail based on the following figures, wherein.

DETAILED DESCRIPTION

Hereinafter, an exemplary embodiment of the present invention will be described based on the drawings.

Figure 1:
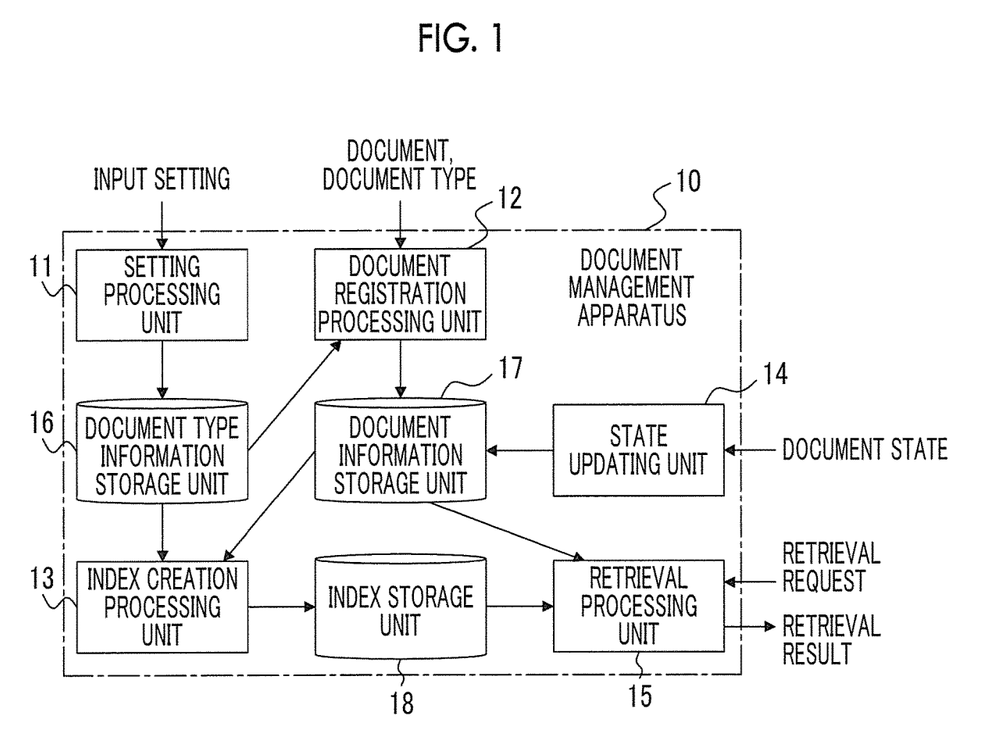
FIG. 1 is a block configuration diagram of a document management apparatus in a present exemplary embodiment.

FIG. 1 is a block diagram of a document management apparatus 10 in the present exemplary embodiment. The document management apparatus 10 in the present exemplary embodiment can be realized by an information processing apparatus such as a general-purpose server computer. That is, the document management apparatus 10 has storage sections such as a CPU, a ROM, a RAM, and a hard disk drive (HDD), and has a network interface in a case of acquiring a document to be processed via a network. In a case where contents are read from a computer readable recording medium such as a CD-ROM or a USB memory, it is necessary to provide an external interface therefor. Further, since the document management apparatus 10 needs to transmit and receive information with a user, the document management apparatus 10 has, for example, an input section such as a mouse or a keyboard, or a display section such as a display as a user interface to transmit and receive information with the user. Alternatively, in a case of transmitting and receiving information with a user via a network, a network interface is provided.

As shown in FIG. 1, the document management apparatus 10 in the present exemplary embodiment has a setting processing unit 11, a document registration processing unit 12, an index creation processing unit 13, a state updating unit 14, a retrieval processing unit 15, a document type information storage unit 16, a document information storage unit 17, and an index storage unit 18. Components that are not used in the description of the present exemplary embodiment are omitted from the drawings.

The setting processing unit 11 sets information related to a document type of a document to be managed by the document management apparatus 10 (hereinafter, "document type information") in response to an input by a document administrator or the like (hereinafter, "administrator"), and registers the information in the document type information storage unit 16. The document registration processing unit 12 generates document information by associating a document type of a document with the document to be a creation target of an index specified by the user, and registers the document information in the document information storage unit 17. The term "document" in the present exemplary embodiment refers to data including text characters capable of being digitized and recorded in the document information storage unit 17.

The index creation processing unit 13 creates an index of a document with reference to a reference range set in the document type information associated with a document type of the document of an index creation target received by the document registration processing unit 12, and stores the index of the document in the index storage unit 18. When a change in a state of a document is detected, an index of the document is re-created and the existing index is updated. The term "index" refers to index data used for speeding up a retrieval. The index is created by associating the index with each document. There is a full-text retrieval as a method of retrieving a document. In the full-text retrieval, in a case of retrieving a target document, character strings such as terms included in the entire content of the document, are retrieved. However, in a case where a large number of documents are stored in a retrieval target database, retrieving the entire content of a document may result in huge retrieval time. Therefore, a term representing a feature of a document is extracted from the document and stored separately by using indexing. Storing the extracted term is an index. Thereby, in the full-text retrieval, a document to be retrieved can be found by retrieving the index.

A document registered in the document information storage unit 17 is stored with a current state of the document associated, and in a case where a change in a state of a document is detected, the state updating unit 14 updates the state of the document set in the document information storage unit 17 with a state of the document after the change, and the details will be described later.

A document has a life cycle from when the document is created until the document is not used. A document also has a unique life cycle according to a document type. For example, in a case where the document is a written contract, the written contract is used for a business negotiation, and in a case where the business negotiation is successful then a contract period is started, thereafter the written contract is archived for a fixed period, and finally the written contract is discarded. In other words, the written contract is transitioned to a state of in-business-negotiation, contract-period, archived, and discarded, in the life cycle. In a case where the document is a letter of advice, the letter of advice is transitioned to a state of creation, transmission, utilization, archived, and discarded. Further, in a case where the document is an approval document, the approval document is transitioned to a state of in-editing, drafting, wait-for-approval, approved, archived, and discarded.

As described above, in the present exemplary embodiment, the term "state of document" refers to a state of a document in the life cycle, and can be changed in one direction with the passage of time.

The retrieval processing unit 15 retrieves an index in response to a retrieval request including a retrieval phrase from a user, and presents information related to the one or the plurality of documents to the user in a case of finding one or a plurality of documents corresponding to the retrieval request. Further, in a case where a document is specified by the user from among the documents included in the presented information (that is, the retrieval result), entity data of the document is read from the document information storage unit 17 and provided to the user.

Each component 11 to 15 in the document management apparatus 10 is realized by a cooperative operation of a computer forming the document management apparatus 10 and a program operated by a CPU mounted on the computer. Each of the storage units 16 to 18 is realized by an HDD mounted on the document management apparatus 10. Alternatively, a RAM or an external storage section may be used via a network. In the present exemplary embodiment, the necessary components are mounted on one document management apparatus 10, but may be distributed to a plurality of computers to construct a document management system including the plurality of computers.

Further, a program used in the present exemplary embodiment can be provided by a communication section, and by being stored in a computer readable recording medium such as a CD-ROM or a USB memory as well. The program provided from the communication section or the recording medium is installed in a computer, and various processes are realized by a CPU of the computer sequentially executing the program.

In the present exemplary embodiment, in a case of creating an index, a part of a document is referenced instead of the entire document. The part of the document to be referenced in a case of creating an index (hereinafter, it is also referred to as "reference range for indexing"), is set according to a document type of the document to be a creation target of the index. That is, different parts of the document can be used as a reference range for indexing depending on the type of document.

Further, as described above, a state of a document may change in the life cycle, and moreover, in the present exemplary embodiment, even with the same document type, it is possible to set a priority where which of a plurality of reference ranges for indexing is prioritized as a reference range for indexing depending on a state of a document.

Next, an operation of the present exemplary embodiment will be described, and in the present exemplary embodiment, it is necessary to set document type information in advance before creating an index. Setting of the document type information in advance will be described below.

Figure 2:
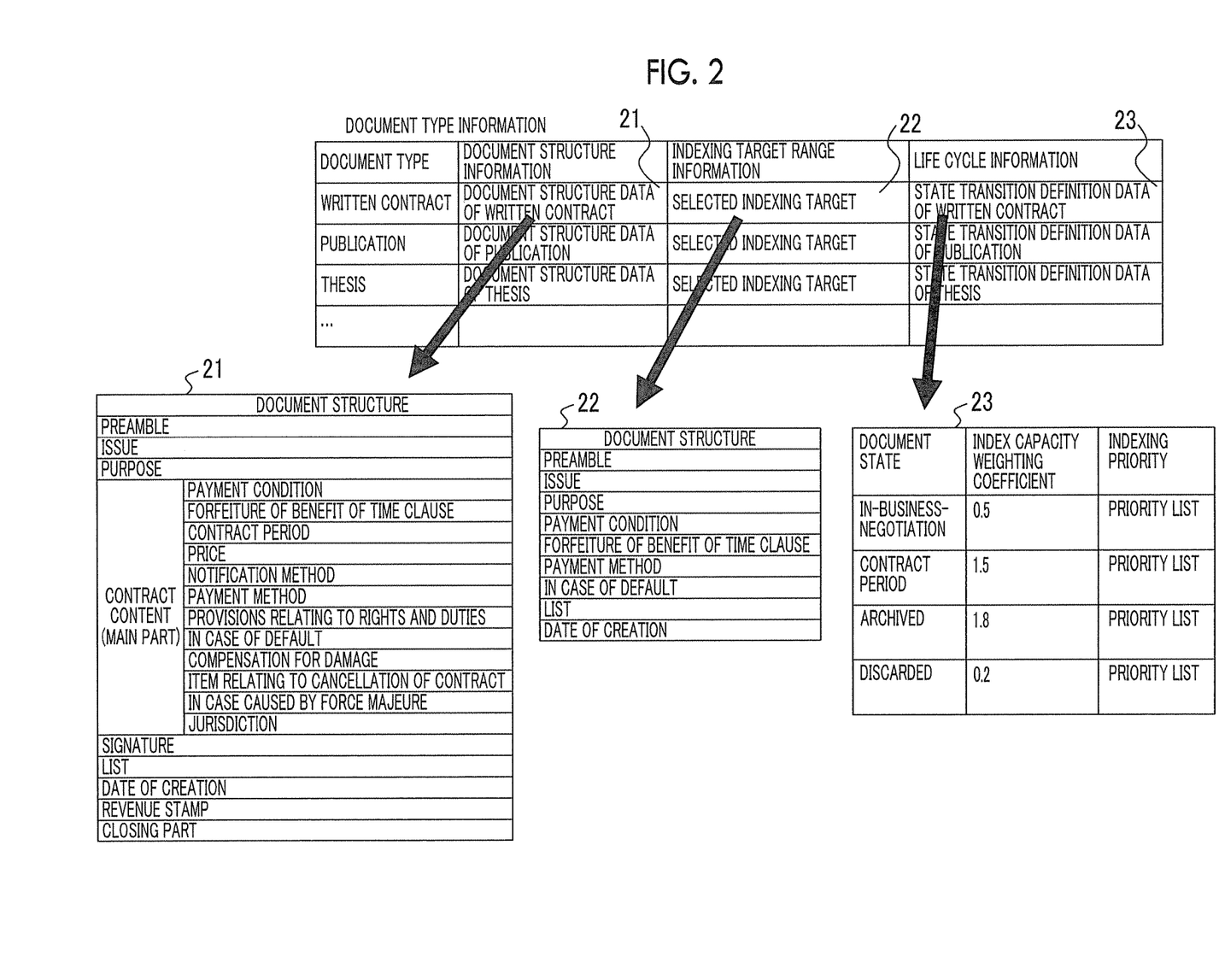
FIG. 2 is a diagram showing an example of a data configuration of document type information set in a document type information storage unit in the present exemplary embodiment.

FIG. 2 is a diagram showing an example of a data configuration of the document type information set in the document type information storage unit 16 in the present exemplary embodiment. The document type information is set for each document type. The document type information shown in FIG. 2 includes document structure information, indexing target range information, and life cycle information. A document can be specified to some extent in content and order to be described, so-called a sentence-structure, according to a type of the document. In particular, in business offices, there are many cases where the sentence-structure is decided by preparing a fixed text or the like. In the document structure information, the sentence-structure is set as document structure data. The document structure data 21 where the document type is a written contract is illustrated in FIG. 2. In indexing target range information, a document structure ("selected indexing target" in FIG. 2) selected by an administrator as a reference range for indexing from the document structure data, is set. The life cycle information includes state transition definition data including an index capacity weighting coefficient and an indexing priority, which are associated with a state of the document in the life cycle of the document type. FIG. 2 illustrates the life cycle information 23 where the document type is a written contract. For example, as described above, the written contract is transitioned to a state of in-business-negotiation, contract-period, archived, and discarded, in the life cycle. Therefore, each state to be transitioned in the document type is set in document states in the life cycle information. The details of the index capacity weighting coefficient and the indexing priority will be described later. In a case of referencing the life cycle information, the document type information may be set for each document type and for each state of the document.

The document type information is set by setting processing that will be described later, and the document structure data and the document states included in the life cycle information in each document type need to be set and registered in the document type information storage unit 16 before the setting processing is performed. The document structure data is assumed to be set in advance by the administrator, but may be automatically generated by analyzing a document structure such as a written contract.

Figure 3:
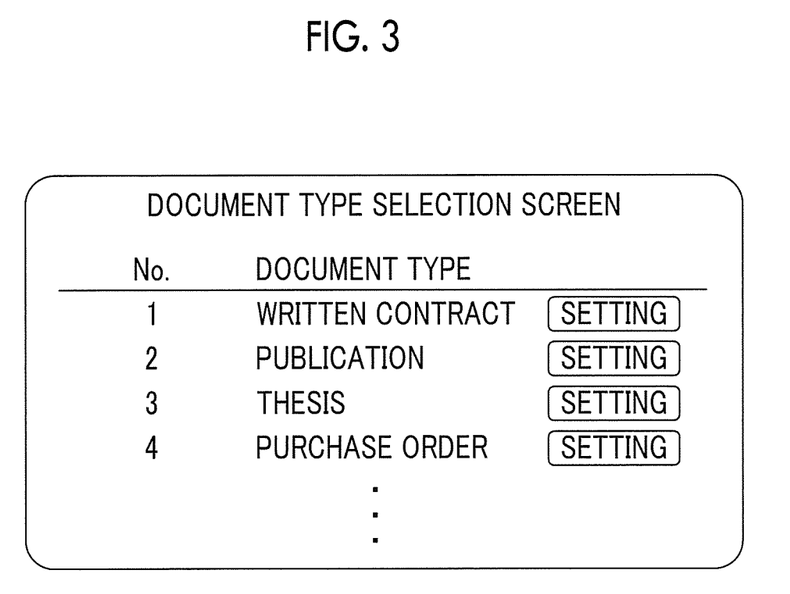
FIG. 3 is a diagram showing an example of a document type selection screen in the present exemplary embodiment.

FIG. 3 is a diagram showing an example of a document type selection screen in the present exemplary embodiment. The administrator displays the document type selection screen by performing a predetermined operation. The administrator may use a user interface of the document management apparatus 10 or may access the document management apparatus 10 from a terminal device via a network to display the document type selection screen on the terminal device.

The setting processing unit 11 reads the document type set in the document type information storage unit 16 in response to a user operation, and displays the document type selection screen. The setting processing unit 11 associates setting buttons with each document type to be displayed. The administrator selects the setting button associated with the document type to be set from the screen. Note that it is also possible to select the setting button associated with the document type already set in the document type information, and in this case, the setting button is positioned as a change setting button.

Figure 4:
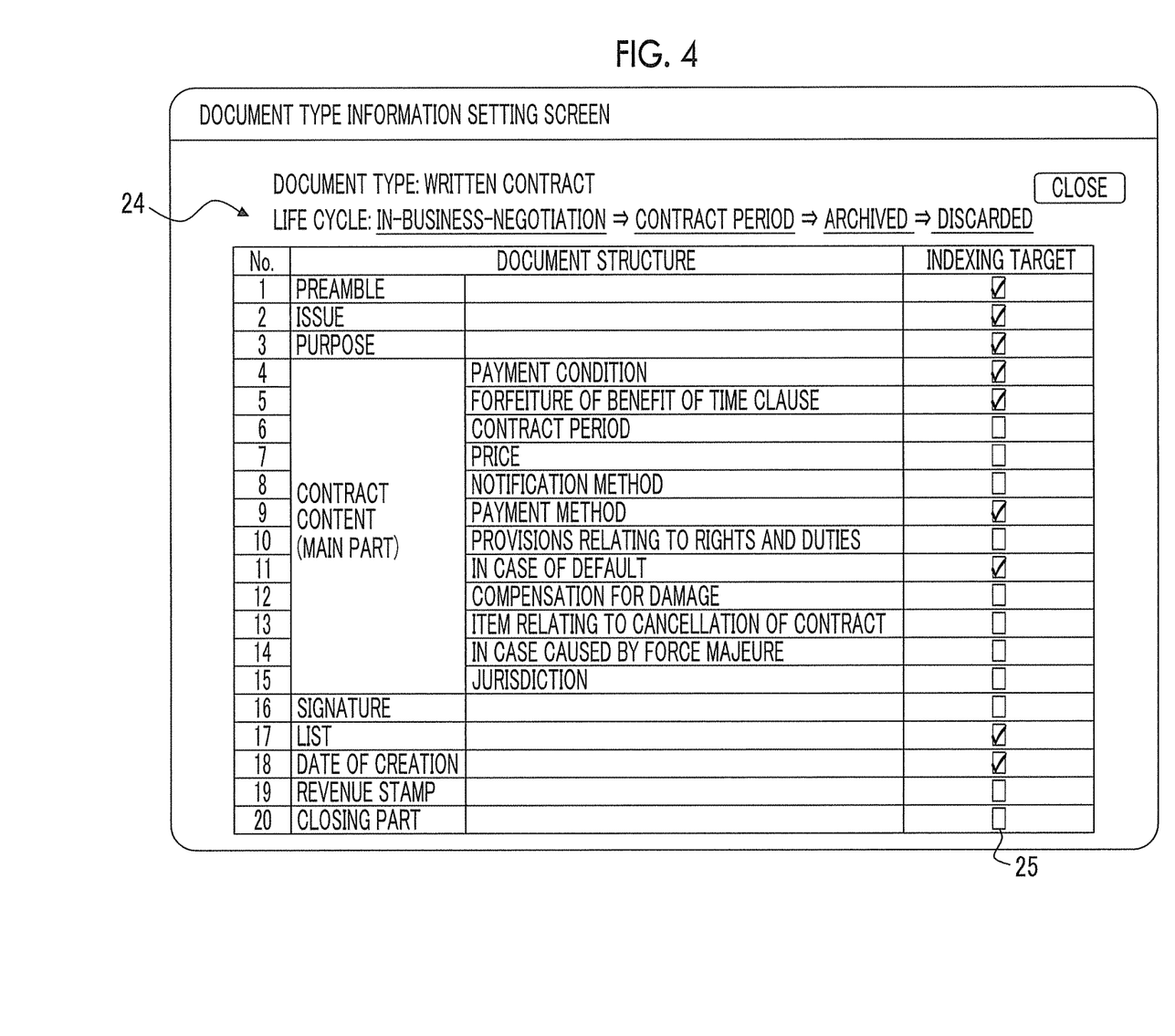
FIG. 4 is a diagram showing an example of a document type information setting screen in the present exemplary embodiment.

FIG. 4 is a diagram showing an example of a document type information setting screen displayed after the setting button is selected from the document type selection screen. FIG. 4 is a display example in a case where a written contract is selected as a document type. The setting processing unit 11 reads a life cycle 24, that is, document states, in the state transition definition data 23 of the written contract from the document type information storage unit 16, and displays each document state on the document type information setting screen in a selectable manner. The setting processing unit 11 reads document structure data 21 of the written contract, and displays the document structure data 21 in a table format. Further, a checkbox 25 for selecting as an indexing target is associated with each item constituting the written contract and displayed. In the present exemplary embodiment, the term "item" refers to a unit in which a document such as a sentence, a clause, or a term constituting a text sentence, is divided and described.

In the document type information setting screen displayed as described above, the administrator checks the checkbox 25 associated with the item to be referenced in a case of creating the index of the written contract, that is, the item to be included in the reference range for indexing. FIG. 4 shows a setting example in a case where the user selects "preamble" as a reference range for indexing among the items constituting the written contract and does not select "contract period".

Among items constituting the document, it is considered that an item including many phrases that are characteristic of the document, is determined to some extent depending on a document type. For example, based on past results, in a case of a written contract, it is known that a preamble, a purpose, a main part of the text, or the like contains relatively many characteristic phrases, and a notification method, a closing part of the text, or the like contains relatively few characteristic phrases. In a case of a publication, it is known that a table of contents, an index, or the like contains relatively many characteristic phrases, and a dedication, a prologue, an epilogue, or the like contains relatively few characteristic phrases. Furthermore, in a case of a thesis, it is known that, a summary, a table of contents, or the like contains relatively many characteristic phrases, and an acknowledgment, a reference, an appendix, or the like contains relatively few characteristic phrases.

Thus, for example, it is preferable for the administrator to select the item containing many phrases that are characteristic of the document, as a reference range for indexing, that is, an indexing target. The terms "reference range for indexing" and "indexing target" may be considered as synonymous. The setting processing unit 11 may automatically select the indexing target based on the past results.

As described above, in a case where one or a plurality of items are selected by the administrator as a reference range for indexing from among the entire items constituting the written contract, the setting processing unit 11 registers the selected item in the document type information storage unit 16 as a selected indexing target 22 in the written contract. In the exemplary embodiment, an index is created with the item selected as described above as a reference range for indexing in the entire document, that is, the written contract in this example.

Further, in the present exemplary embodiment, a priority for a reference range for indexing with respect to each item selected as a reference range for indexing can be further set for each state of the document.

Figure 5:
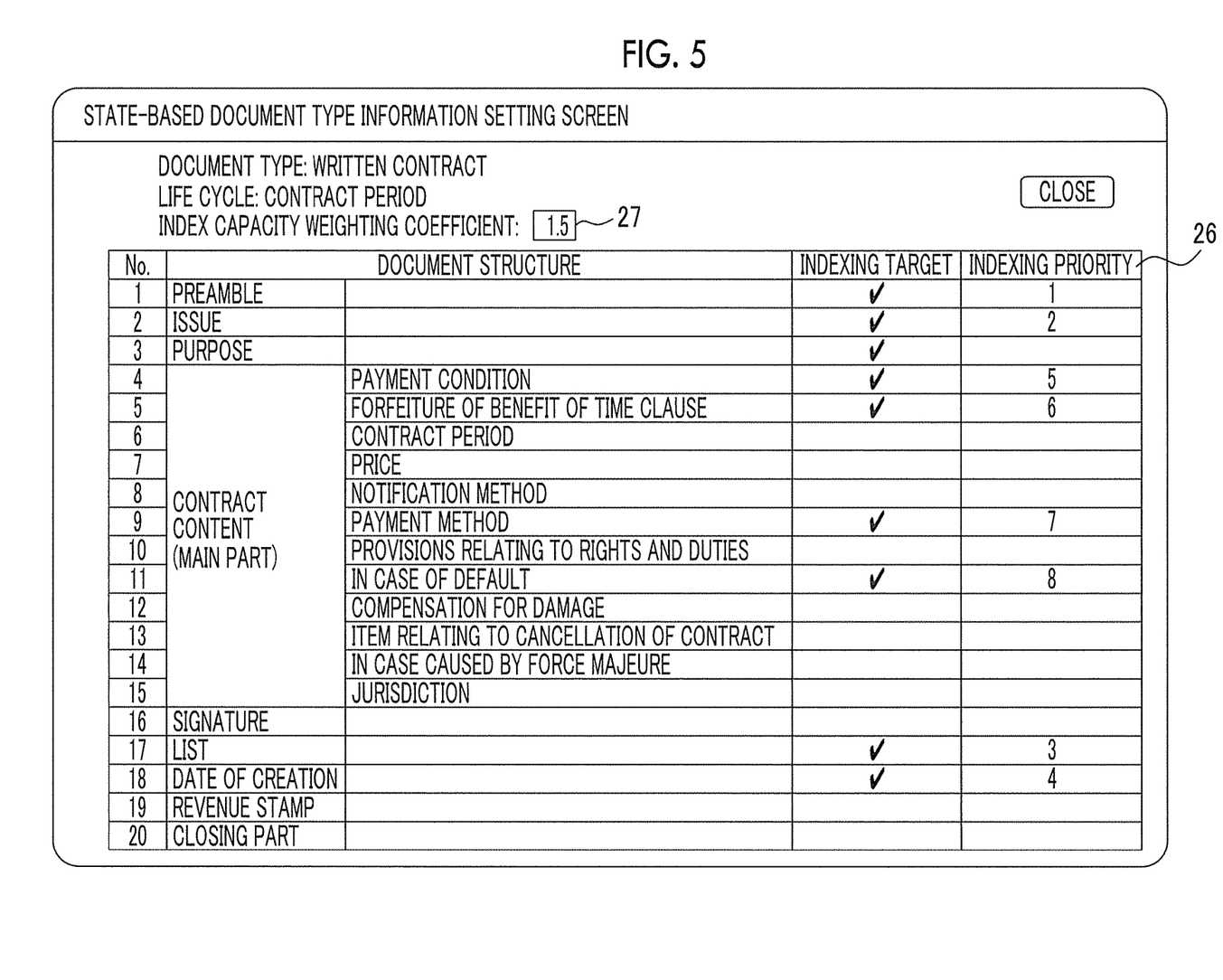
FIG. 5 is a diagram showing an example of a state-based document type information setting screen in the present exemplary embodiment.

FIG. 5 is a diagram showing an example of a state-based document type information setting screen in the present exemplary embodiment. FIG. 5 shows a display example of the state-based document type information setting screen displayed in a case where the administrator selects the "contract period" from among states of the document that are displayed as selectable in the life cycle 24 on the document type information setting screen.

The setting processing unit 11 reads document structure data 21 of the written contract from the document type information storage unit 16, and displays the document structure data 21 in a table format.

A field for the indexing target is checked with respect to the item selected as a reference range for indexing in the above processing among each item in the displayed document structure. Then, indexing priority setting fields 26 are provided by associating the indexing priority setting fields 26 with the document structure. Furthermore, the setting processing unit 11 provides an index capacity weighting coefficient setting field 27 with respect to the state of the document (in this example, "contract period").

The administrator sets the indexing priority for each item of the indexing target from the state-based document type information setting screen. In the present exemplary embodiment, since the priority is increased as the number decreases, the priority is set in order from one. Note that since it is meaningless to set the priority to each item which is not the indexing target, for example, it is preferable to make it impossible to set the priority to each item which is not the indexing target. The user further inputs the index capacity weighting coefficient with respect to the state of the document (in this example, "contract-period") into the setting field 27. The indexing priority and the index capacity weighting coefficient set from the state-based document type information setting screen will be described in detail when used respectively.

As described above, in a case where the user inputs values in each of the fields 26 and 27, the setting processing unit 11 sets and registers the input index capacity weighting coefficient in an index capacity weighting coefficient associated with the selected document state "contract-period" in the written contract shown in FIG. 2. Further, the input indexing priority is set and registered to an indexing priority associated with the selected document state "contract-period" as a priority list.

The "contract-period" of the written contract has been described as an example, and similarly, the index capacity weighting coefficient and the indexing priority are set and registered for the other document states "in-business-negotiation", "archived", and "discarded".

As described above, in the present exemplary embodiment, the document type information is set and registered before starting a creation of an index.

Figure 6:
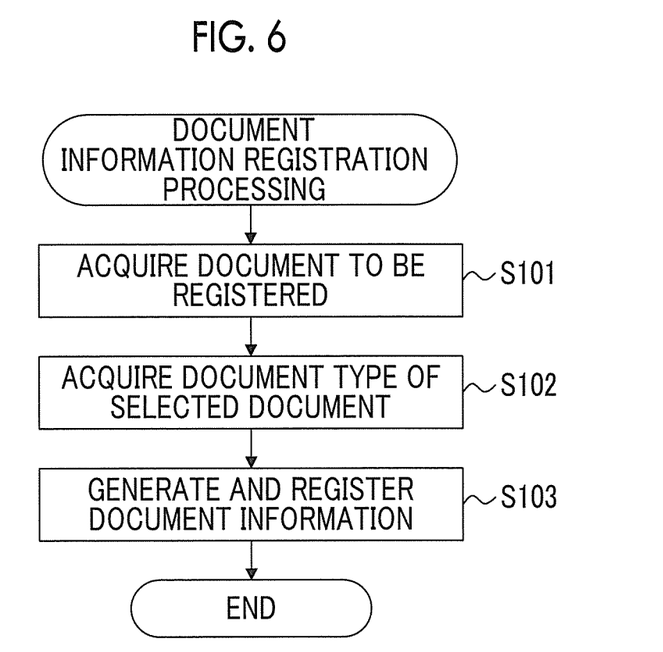
FIG. 6 is a flowchart showing document registration processing in the present exemplary embodiment.

Next, document registration processing for registering a document to be a creation target of the index in the document management apparatus 10 will be described using a flowchart shown in FIG. 6. The document registration processing is performed by the document registration processing unit 12.

In a case where the user performs a predetermined operation, the document registration processing unit 12 displays a document registration screen in response to the user operation. The user may use a user interface of the document management apparatus 10 or may access the document management apparatus 10 from a terminal device via the network to display the document registration screen on the terminal device.

Figure 7:
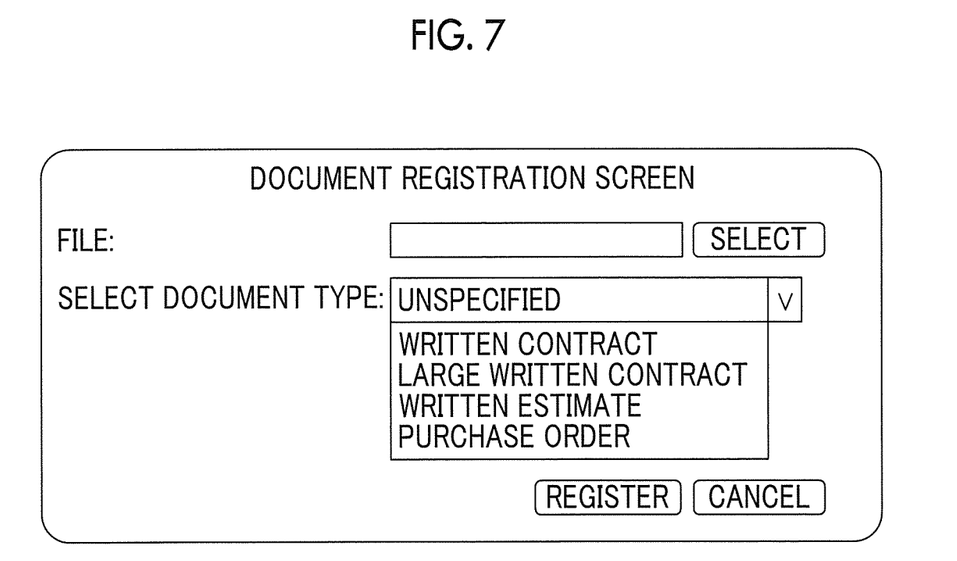
FIG. 7 is a diagram showing an example of a document registration screen in the present exemplary embodiment.

FIG. 7 is a diagram showing an example of a document registration screen in the present exemplary embodiment. The user inputs and specifies a file name and a document type of a file to be registered from the document registration screen, and then selects a registration button. In response to the selection of the registration button, the document registration processing unit 12 acquires the document from the storage location specified by the file name (step S101), and acquires the document type of the selected document (step S102). Then, the document registration processing unit 12 generates document information by combining the file name of the document to be registered, entity data of the document, and attribute information of the document, and registers the document information in the document information storage unit 17 (step S103).

Figure 8:
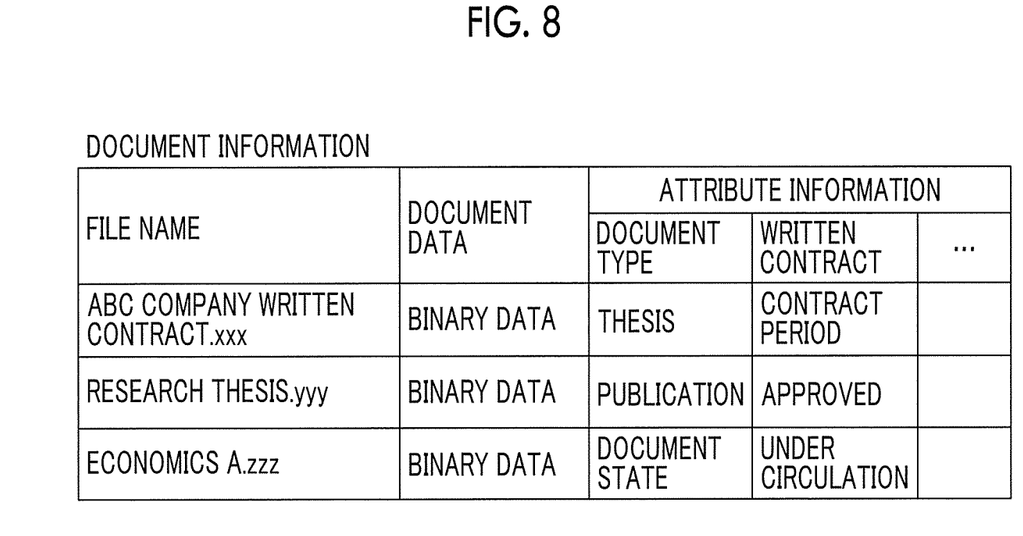
FIG. 8 is a diagram showing an example of a data configuration of document information registered in a document information storage unit in the present exemplary embodiment.

FIG. 8 is a diagram showing an example of a data configuration of document information registered in a document information storage unit 17 in the present exemplary embodiment. The document information has the above-described data configuration, and the document type specified by the administrator is registered in the document information as one of attribute information. A document state included in the attribute information indicates a state of the document in the document type of the document, and the document registration processing unit 12 reads and sets the first document state among the life cycle of the document type set in the document type information storage unit 16 as an initial value. Note that, for example, in the document registration screen, in a case where a document type is selected, the life cycle of the document type may be displayed to allow the user to specify a state of the document at registration time so that it is possible to associate even in a case where the state of the document registered in the document information storage unit 17 is transitioned to the next state. Alternatively, the document registration processing unit 12 may cause the state updating unit 14 to acquire a document state of the document and cause the document information storage unit 17 to set and register the document state of the document. Information such as a creator of the document or an access authority may be set in the attribute information of the document, the information is omitted in the present exemplary embodiment because it is not used.

In a case where a document is registered as described above, an index is created with respect to the registered document. Hereinafter, indexing processing performed by an index creation processing unit 13 will be described using a flowchart shown in FIG. 9.

Figure 9:
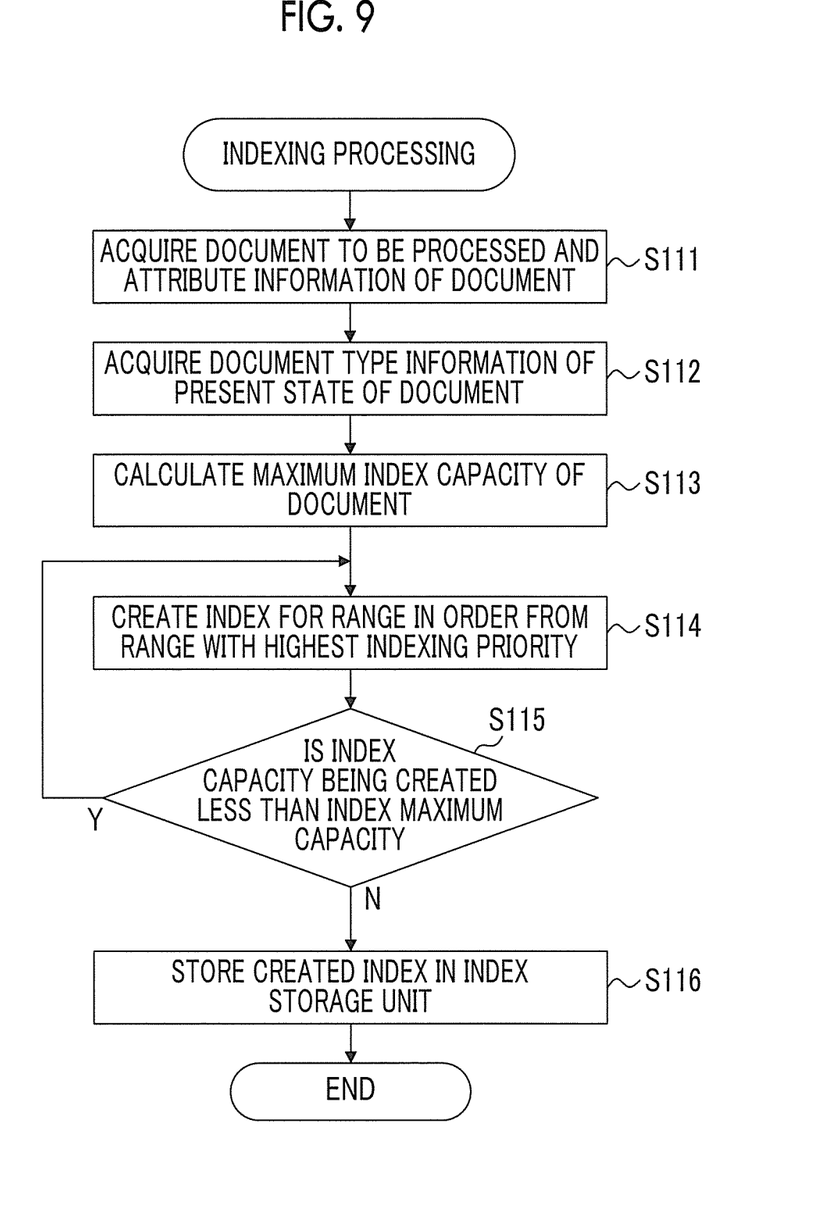
FIG. 9 is a flowchart showing indexing processing in the present exemplary embodiment.

The index creation processing unit 13 acquires a document to be processed, and a document type and a document state included in the attribute information of the document, from the document information storage unit 17 (step S111). Subsequently, the index creation processing unit 13 acquires document type information corresponding to the acquired document state among the document type information associated with the acquired document type (step S112). For example, in a case where the document is a written contract, and in addition to the document structure data 21 and the selected indexing target 22 shown in FIG. 2, in a case where a current state of the document is an in-business-negotiation, the index capacity weighting coefficient and the priority list associated with the in-business-negotiation from the state transition definition data 23, are acquired.

A reference capacity is defined in the index registered in the index storage unit 18. The index creation processing unit 13 calculates the maximum index capacity to be created by multiplying the reference capacity by the acquired index capacity weighting coefficient (step S113). That is, the index creation processing unit 13 sets the maximum index capacity according to the document type. Then, the index creation processing unit 13 creates an index by repeatedly executing the following process until a capacity reaches the calculated maximum capacity.

That is, the index creation processing unit 13 references the acquired priority list and determines the order of the reference range for indexing to be referenced in a case of indexing. Therefore, the index creation processing unit 13 creates the index by performing the indexing with the item having the highest priority as a reference range among the items that are not yet used for the reference range for indexing (step S114). The index creation processing unit 13 compares an index capacity in a case where a newly created index is added to the index created by repeatedly executing step S114, and the maximum capacity calculated in step S113. Then, in a case where the index capacity being created does not reach the maximum capacity (Y in step S115), the newly created index is added to the already created index, and the process returns to step S114.

By repeating the above process, the index capacity being created increases, and in a case where the index capacity being created reaches the maximum capacity (N in step S115), the index creation processing unit 13 ends the indexing without adding the newly created index because adding the newly created index to the already created index will exceed the maximum capacity. Then, the index at the time the process is ended, is stored in the index storage unit 18 as an index of the document (step S116).

In the present exemplary embodiment, as described above, an index is created so as to fit in the maximum capacity by referencing the reference range for high priority indexing sequentially. As described above, according to the present exemplary embodiment, even in a case where the maximum capacity is set in the index, a phrase representing the feature of the document can be preferentially included in the index, so that the retrieval accuracy can be improved.

In the present exemplary embodiment, even with the same document type, the contents of the index can be changed according to a change in a state of the document. For example, in a case where the state updating unit 14 manages a state of the document in an external process management system (not shown), the state updating unit 14 detects that the state of the document is transitioned by receiving a notification from the process management system or by inquiring of the process management system. The state updating unit 14 updates the document state set in the attribute information of the document information storage unit 17 so as to change the state to a state after the transition in a case where a change in state is detected as the document state is transitioned.

In a case where the document state set in the document information storage unit 17 is updated, the index creation processing unit 13 starts an execution of the indexing processing to re-create the index of the document. The indexing processing executed at this time is the same as the content described using the flowchart shown in FIG. 4, and in step S112, the index creation processing unit 13 reads the index capacity weighting coefficient and the priority list associated with the document state after the transition from the document type information storage unit 16 and processes the index capacity weighting coefficient and the priority list. In this way, an index is created and updated according to a state of a document.

In a case where the document management system provides a full-text retrieval function, so-called a full-text indexing may be performed in which the entire description of the document stored in the document management system to be retrieved becomes a reference range for indexing. In the full-text indexing, an index capacity, which is created from the fact that the entire document is a reference range, tends to be relatively large. In a case where the document management system is realized by a cloud that employs pay-as-you-go, cost increases as the index capacity increases.

Therefore, it is a common practice to reduce the index capacity by performing so-called a partial indexing in which the reference range for indexing is partial rather than the entire document. The partial indexing is similarly performed in the present exemplary embodiment.

However, in a case of partial indexing, it is considered that the retrieval accuracy differs depending on which part of the document is used for a reference range for indexing. Therefore, in the present exemplary embodiment, the reference range for indexing can be set according to the document type. As described above, a document can be specified to some extent in content and order to be described, so-called a sentence-structure according to a document type. In a case where the sentence-structure can be specified, that is, in a case where the items that constitute the document can be specified, it is possible to specify to some extent which item has an important description, in other words, which item contains more phrases representing the feature of the document. Therefore, in the present exemplary embodiment, it is focused on a document type, and a reference range for indexing can be set for each document type. Further, in the present exemplary embodiment, the reference range for indexing can be extracted in item units constituting the document.

As described above, in the present exemplary embodiment, a part of a document to be selected as a reference range for indexing can be dynamically set according to a document type. In this way, it is possible to effectively extract a part that represents a feature of a document, as compared to a case where a predetermined part of the document is uniformly used as a reference range for indexing. In other words, since it is possible to include more phrases that represent the features of the document in the index, the document can be easily retrieved, thereby the retrieval accuracy can be improved. Further, since it is possible to exclude phrases that do not represent the features of the document from the index, retrieval noise can be reduced.

In the present exemplary embodiment, as described above, the reference range for indexing can be set for each document type. However, even for the same document type, it is considered that phrases to be retrieved change depending on the state of the document in the life cycle. For example, in a case where the document is a written contract, it is assumed that a contract condition or a description range of work content is frequently referenced while it is in business negotiation, thereby, for example, it is preferable to create an index so that it can be retrieved through a related retrieval phrase. Further, unlike in business negotiation, it is assumed that a response to default or a scope of coverage is frequently referenced during the contract period, thereby, for example, it is preferable to create an index so that it can be retrieved through a related retrieval phrase. Furthermore, it is assumed that a statement relating to a contract period or price is frequently referenced for audit during the document is archived, thereby, for example, it is preferable to create an index so that it can be retrieved through a related retrieval phrase.

Therefore, it is not limited and it is desirable to be able to set the reference range for indexing individually according to the state of the document even for the same document type, but in the present exemplary embodiment, as described above, the reference range for indexing can be set for each document type and for each state of the document.

On the other hand, as described above, in a case of pay-as-you-go, for example, it is desirable to set a certain limit on the index capacity to be created. In this case, for example, it is preferable to preferentially include the phrases described in the item in which the reference frequency is high among the selected items to be the indexing target, in the index. Therefore, in the present exemplary embodiment, in addition to setting the capacity to allow the creation of the index ("maximum index capacity" described above), the priority (that is, "indexing priority" set from the state-based document type information setting screen shown in FIG. 5) can be set according to the state of the document with respect to each item extracted as an indexing target. For example, in a case where the indexing is performed such that the priority of item having a high reference frequency can be set high in the document state, the item with higher priority is given priority in the reference range for indexing, and the phrase that represents the feature of the document in the state of the document is included in the index. As a result, it is possible to improve the retrieval accuracy while suppressing the increase in cost associated with the pay-as-you-go.

As described above, in consideration of the cost dependent on the index capacity, for example, it is desirable to minimize the index capacity. However, considering the retrieval accuracy, the capacity may not be reduced unnecessarily. Therefore, in the present exemplary embodiment, the index capacity weighting coefficient is set for each state of the document, and the maximum index capacity can be set according to the state of the document. For example, in a case where the state of the document of the written contract is a discarded, it is considered that the document is relatively unlikely to be retrieved because the contract is discarded. Therefore, in this case, priority is given to cost, and the maximum index capacity is made relatively small. Thereby, the index capacity to be created can be made relatively small. On the other hand, in a case where the state of the document of the written contract is a contract-period or an archived, the document is likely to be used frequently, the maximum index capacity is made relatively large so as to be easily retrieved. As a result, it is possible to improve the retrieval accuracy although the index capacity to be created becomes relatively large.

In the present exemplary embodiment, in order to limit the maximum index capacity per document, the case where one or more numerical values are set as an index capacity weighting coefficient by which the reference capacity is multiplied, is illustrated. In a case where an upper limit is set to the index capacity registered in the index storage unit 18, the index capacity weighting coefficient needs to be a positive number of 1 or less in order to multiply by the upper limit index capacity. All the indexes may be created uniformly with the upper limit capacity. However, in consideration of the pay-as-you-go, in a case where the state of the document is not used frequently, as described above, for example, it is desirable to create the index so as to reduce the index capacity.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a processor, configured to:
      acquire document information with which a document type of a document is associated;
      acquire document type information, in which a reference range of a document referenced in a case of creating index data is set, for each document type of a document, wherein a different document type corresponds to a different reference range that represents a different part of contents of a document, wherein in response to the document type of the document being in a first type, the reference range of the document corresponds to a first reference range that represents a first part of the contents of the document, wherein in response to the document type of the document being in a second type, the reference range of the document corresponds to a second reference range that represents a second part of the contents of the document, and wherein the first type is different from the second type, the first reference range is different from the second reference range;
      create the index data of the document by extracting at least one term from a range of the document corresponding to the reference range set in the document type information associated with the document type of the document; and
      associate the index data with the document for document retrieval.

2. The information processing apparatus according to claim 1,
   wherein in a case where a state of the document is transitioned, the state of the document is further associated with the document included in the document information,
   wherein the document type information is set for each document type of the document and for each state of the document, and
   wherein the processor creates the index data of the document with reference to the range of the document corresponding to the reference range set in the document type information associated with the document type and the state of the document.

3. The information processing apparatus according to claim 2,
   wherein in a case where a change in the state of the document is detected, the processor re-creates the index data of the document by extracting at least one another term from the range of the document corresponding to the reference range set in the document type information associated with the document type of the document and a changed state of the document.

4. The information processing apparatus according to claim 1,
   wherein the reference range is set by selecting one or a plurality of items constituting the document.

5. The information processing apparatus according to claim 2,
   wherein the reference range is set by selecting one or a plurality of items constituting the document.

6. The information processing apparatus according to claim 4,
   wherein a priority in a case of referencing at the time of creating the index data is set for each item set in the reference range, and
   wherein the processor determines an order of items referenced at the time of creating the index data according to the priority set for each item included in the reference range.

7. The information processing apparatus according to claim 5,
   wherein a priority in a case of referencing at the time of creating the index data is set for each item set in the reference range, and
   wherein the processor determines order of items referenced at the time of creating the index data according to the priority set for each item included in the reference range.

8. The information processing apparatus according to claim 1,
   wherein in a case where a state of the document is transitioned, the processor sets a maximum capacity of the index data of the document according to the state of the document.

9. The information processing apparatus according to claim 8,
   wherein the document type information is generated for each document type of the document and for each state of the document,
   wherein a weighting coefficient of a capacity of the index data is set n each document type information, and wherein the processor creates the index data of the document so as to be within the maximum capacity obtained by multiplying a predetermined reference capacity of the index data by the weighting coefficient set in the document type information associated with the document type and the state of the document.

10. The information processing apparatus according to claim 1,
wherein the document has a life cycle, from when the document is created until the document is not used, comprising a plurality of states, a different document type has a different life cycle,
wherein in a case where a change in the state of the document is detected, the processor re-creates the index data of the document by extracting at least one another term from the range of the document corresponding to the reference range set in the document type information associated with the document type of the document and a changed state of the document.

11. A non-transitory computer readable medium storing a program causing a computer:
acquire document information with which a document type of a document is associated;
acquire document type information, in which a reference range of a document referenced in a case of creating index data is set, for each document type of a document, wherein a different document type corresponds to a different reference range that represents a different part of contents of a document, wherein in response to the document type of the document being in a first type, the reference range of the document corresponds to a first reference range that represents a first part of the contents of the document, wherein in response to the document type of the document being in a second type, the reference range of the document corresponds to a second reference range that represents a second part of the contents of the document, and wherein the first type is different from the second type, the first reference range is different from the second reference range;
create the index data of the document by extracting at least one term from a range of the document corresponding to the reference range set in the document type information associated with the document type of the document; and
associate the index data with the document for document retrieval.

* * * * *